United States Patent
Yukumatsu

(10) Patent No.: US 9,797,992 B2
(45) Date of Patent: Oct. 24, 2017

(54) FMCW RADAR APPARATUS

(71) Applicant: DENSO CORPORATION, Kariya, Aichi-pref. (JP)

(72) Inventor: Masanobu Yukumatsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 308 days.

(21) Appl. No.: 14/653,248

(22) PCT Filed: Dec. 17, 2013

(86) PCT No.: PCT/JP2013/083737
§ 371 (c)(1),
(2) Date: Jun. 17, 2015

(87) PCT Pub. No.: WO2014/098074
PCT Pub. Date: Jun. 26, 2014

(65) Prior Publication Data
US 2015/0331089 A1    Nov. 19, 2015

(30) Foreign Application Priority Data

Dec. 17, 2012   (JP) ................................ 2012-274828

(51) Int. Cl.
  *G01S 7/35*   (2006.01)
  *G01S 7/40*   (2006.01)
  (Continued)

(52) U.S. Cl.
  CPC .............. *G01S 7/35* (2013.01); *G01S 7/4008* (2013.01); *G01S 7/4056* (2013.01); *G01S 13/34* (2013.01); *G01S 13/93* (2013.01)

(58) Field of Classification Search
  CPC ...... G01S 7/02; G01S 7/35; G01S 7/40; G01S 7/4004; G01S 7/4008; G01S 7/4052;
  (Continued)

(56) References Cited

U.S. PATENT DOCUMENTS 3,171,112 A * 2/1965 Martin .................. G01S 7/4008
                                               315/132
3,740,640 A * 6/1973 Ravas ..................... G01S 7/282
                                               307/108
(Continued)

FOREIGN PATENT DOCUMENTS

JP    H07-151852    6/1995
JP    H10-213651    8/1998
(Continued)

OTHER PUBLICATIONS

International Search Report; International Application No. PCT/JP2013/083737, filed Dec. 17, 2013; 12 pages.
(Continued)

*Primary Examiner* — Bernarr Gregory
(74) *Attorney, Agent, or Firm* — Knobbe, Martens, Olson & Bear, LLP

(57) ABSTRACT

In a frequency modulated continuous wave (FMCW) radar apparatus, a transmitting section transmits a transmission signal and a receiving section outputs a beat signal. During this output period, a frequency-intensity property of a bias power supply voltage supplied from a power supply bias circuit is obtained. On the basis of determining whether or not the obtained frequency-intensity property satisfies a predetermined oscillation condition, it is checked whether or not there occurs oscillation in the power supply bias circuit.

20 Claims, 5 Drawing Sheets

(51) Int. Cl.
*G01S 13/34* (2006.01)
*G01S 13/93* (2006.01)
*G01S 7/00* (2006.01)
*G01S 13/00* (2006.01)

(58) Field of Classification Search
CPC ........ G01S 7/4056; G01S 13/02; G01S 13/06; G01S 13/08; G01S 13/32; G01S 13/34; G01S 13/88; G01S 13/93; G01S 7/023; G01S 7/03; G01S 7/032; G01S 7/28; G01S 7/282; G01R 27/02; G01R 27/16; G01R 27/18
See application file for complete search history.

(56) References Cited

U.S. PATENT DOCUMENTS

| | | | | |
|---|---|---|---|---|
| 3,760,256 A | * | 9/1973 | Rast, Jr. | G01S 7/282 363/47 |
| 4,682,369 A | * | 7/1987 | Schrader | G01S 7/282 315/105 |
| 4,809,123 A | * | 2/1989 | Allington | G01R 27/18 324/509 |
| 4,814,770 A | * | 3/1989 | Reger | G01S 7/28 323/222 |
| 5,093,667 A | * | 3/1992 | Andricos | G01S 7/032 330/130 |
| 5,170,112 A | * | 12/1992 | van der Mark | G01S 7/282 219/760 |
| 9,360,548 B2 | * | 6/2016 | Kato | G01S 7/023 |
| 2008/0158046 A1 | | 7/2008 | Kai | |
| 2010/0277359 A1 | | 11/2010 | Ando | |

FOREIGN PATENT DOCUMENTS

| | | |
|---|---|---|
| JP | H11-52052 | 2/1999 |
| JP | 2000-346927 | 12/2000 |
| JP | 2004-280549 | 10/2007 |
| JP | 2008-107281 | 5/2008 |
| JP | 2010-261784 | 11/2010 |
| JP | 2011-099676 | 5/2011 |
| WO | WO2014098074 | 6/2014 |

OTHER PUBLICATIONS

International Preliminary Report on Patentability; International Application No. PCT/JP2013/083737; Filed: Dec. 17, 2013 (with English translation).

* cited by examiner

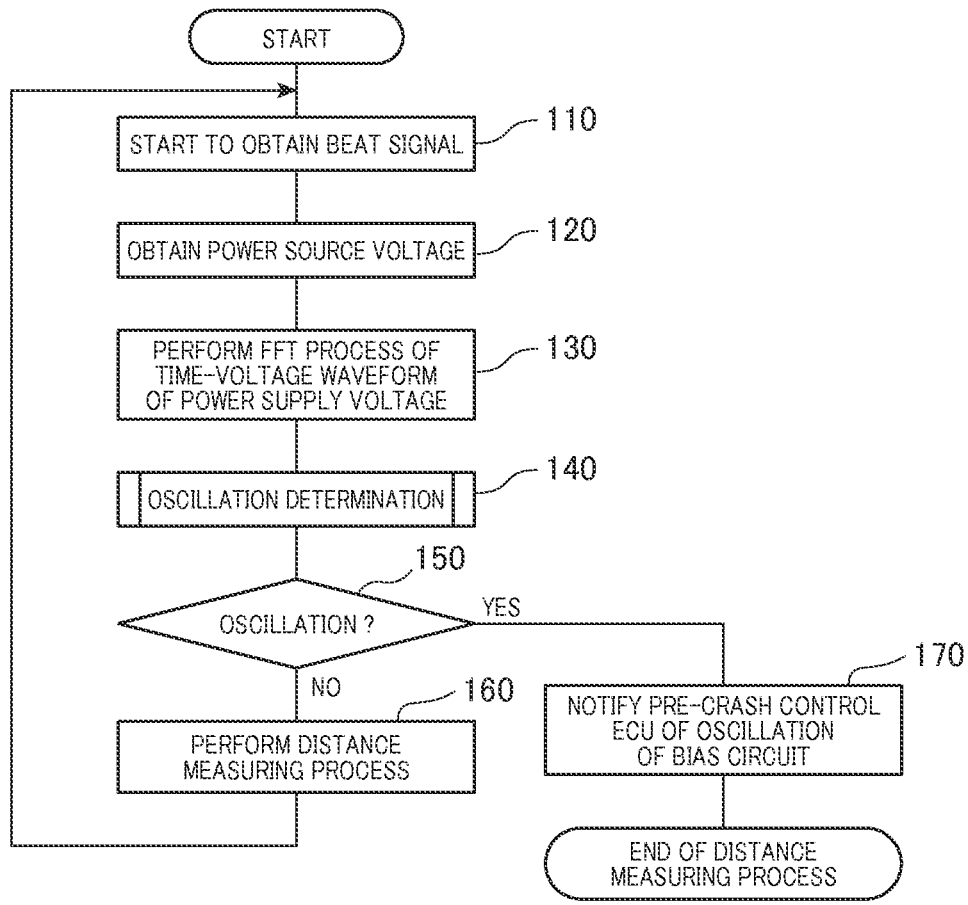
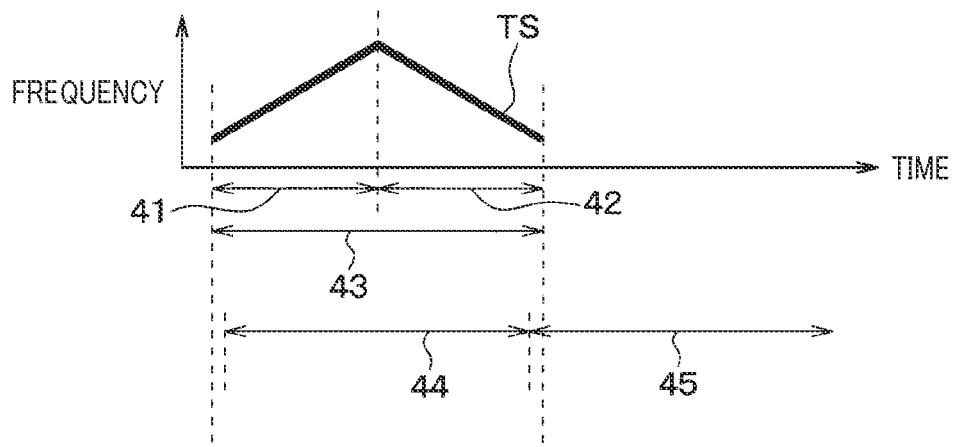

FMCW RADAR APPARATUS

CROSS-REFERENCE TO RELATED APPLICATION

This application is based on and claims the benefit of priority from earlier Japanese Patent Application No. 2012-274828 filed on Dec. 17, 2012 the descriptions of which are incorporated herein by reference.

BACKGROUND

Technical Field

The present invention relates to a radar apparatus of a type called a frequency modulated continuous wave (FMCW) radar.

Background Art

There are a variety types of radar apparatuses depending on the modulating method and the measurement principle of the transmission radio waves. Such apparatuses include a frequency modulated continuous wave (FMCW) radar (hereinafter, simply referred to as FMCW radar apparatus).

PTL 1 describes a technique of removing oscillation noise caused by oscillation of a power supply bias circuit in the FMCW radar apparatus.

CITATION LIST

Patent Literature

[PTL 1] JP-A-H07-151852

Technical Problem

Summary

Thus it is desired to detect oscillation noise caused by oscillation of a power supply bias circuit in the FMCW radar in a different way from the conventional.

Solution to Problem

According to an exemplary embodiment, an FMCW radar apparatus includes a transmitting section that transmits a transmission signal having a frequency-rising time period in which a frequency sequentially increases and a frequency-falling time period in which a frequency sequentially decreases, a receiving section that receives a reception signal which is a result of the transmission signal being reflected by an object and outputs a beat signal on the basis of the transmission signal and the reception signal, a control unit that detects a target on the basis of the beat signal, a power supply bias circuit that generates a bias power supply voltage, and a circuit that outputs a voltage value which corresponds to the inputted bias power supply voltage which is inputted from the power supply bias circuit to at least the transmitting section and the control unit among the transmitting section, the receiving section and the control unit. The FMCW radar apparatus is characterized in that the control unit includes a frequency-intensity property obtaining unit that obtains a frequency-intensity property of the voltage value outputted from the circuit during a voltage obtaining period which is within a period in which the transmitting section transmits the transmission signal and the receiving section outputs the beat signal, and a determination unit that determines whether there is oscillation in the power supply bias circuit or not on the basis of whether the frequency-intensity property obtained by the frequency-intensity property obtaining unit satisfies a predetermined oscillation condition or not.

Accordingly, the control unit obtains the frequency-intensity property of the voltage value which corresponds to the bias power supply voltage during the voltage obtaining period which is within the period in which the transmitting section transmits a transmission signal and the receiving section outputs a beat signal. Then, whether there is oscillation in the power supply bias circuit or not is determined on the basis of the frequency-intensity property.

With this configuration, oscillation noise caused by oscillation of the power supply bias circuit can be detected in a non-conventional way. Further, oscillation of the power supply bias circuit during actual distance measuring operation of the FMCW radar apparatus can be directly detected since the frequency-intensity property which is used for determining whether there is oscillation or not is a property of the voltage obtaining period in which the transmitting section transmits a transmission signal and a receiving section outputs a beat signal.

A configuration and operation according to other exemplary embodiments will be described below by way of the following embodiments with reference to the accompanying drawings.

BRIEF DESCRIPTION OF THE DRAWINGS

In the accompanying drawings:

FIG. 2 is a flow chart of a processing performed by a control unit;

FIG. 3 is a view which shows a period of one sweep of transmission signal, a voltage obtaining period and the like.

FIG. 9 is a view which shows a sub-period and the like.

DESCRIPTION OF EMBODIMENTS

First Embodiment

The first embodiment of the present invention will be described below.

Figure 1:
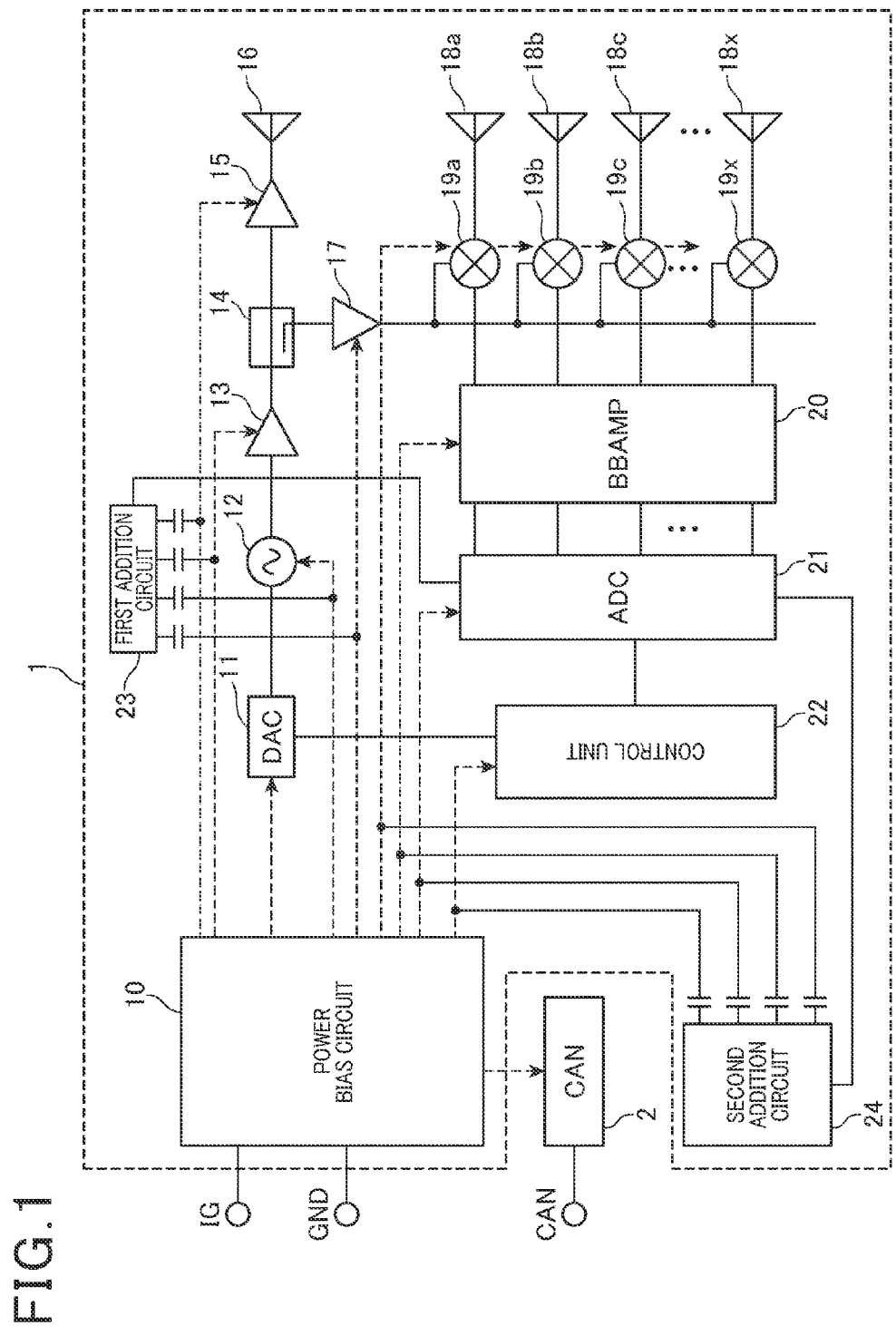
FIG. 1 is a block diagram of an FMCW radar apparatus according to a first embodiment of the present invention.

An FMCW radar apparatus 1 according to the present embodiment shown in FIG. 1 is mounted in a vehicle and emits radio waves in a millimeter wave band in a traveling direction of the vehicle, for example, in the forward direction. Then, the FMCW radar apparatus 1 receives the radio wave reflected by a target such as a preceding vehicle or an obstacle as an incoming wave so as to determine a distance from the apparatus to the target and a relative speed of the target to the apparatus.

As shown in FIG. 1, the FMCW radar apparatus 1 for vehicle is mounted in a vehicle and includes, as a transmitting section, a DAC (D/A converter) 11, a VCO (voltage control oscillator) 12, a BA (buffer amplifier) 13, a distributor 14, a PA (power amplifier) 15 and a transmitting antenna 16. Further, the FMCW radar apparatus 1 includes, as a receiving section, an LA (local amplifier) 17, a plurality of receiving antennas 18a, 18b, 18c to 18x, a plurality of mixers 19a, 19b, 19c to 19x which correspond to the receiving antennas 18a, 18b, 18c to 18x, respectively, a BBAMP (baseband amplifier) 20 and an ADC 21. Further, the FMCW radar apparatus 1 includes a control unit 22, a first addition circuit 23 and a second addition circuit 24.

In a vehicle, there are provided a CAN (controller area network) 2 as an in-vehicle LAN (local area network), the FMCW radar apparatus 1 and a power supply bias circuit 10 that supplies power source voltage to the CAN 2. An IG (ignition) line and a GND (ground) line of the vehicle are connected to the power supply bias circuit 10 such that a predetermined DC power supply voltage is supplied to each of the elements 11, 12, 13, 15, 17, 19, 20, 22, 23, 24 of the FMCW radar apparatus 1 and the CAN 2 when the IG is on.

The DC power supply voltage needs to be supplied to the transmitting section and the control unit. However, the DC power supply voltage does not necessarily need to be supplied to the receiving section depending on the circuit configuration.

The DAC 11 is a DA converter that converts a digital signal of triangular wave having a predetermined length which is inputted from the control unit 22 into an adjustment level of the VCO 12 and outputs it as an analog-modulated signal of triangular wave of a predetermined cycle.

The VCO 12 outputs a signal having a frequency modulated by the analog-modulated signal of triangular wave which is inputted from the DAC 11 (which corresponds to a normalized signal), and the BA 13 amplifies and outputs this signal. The signal which is output from the VCO 12 is a signal in a millimeter wave band (for example, a signal having a center frequency of 76.5 GHz, a frequency width of 300 MHz). More specifically, the signal has a frequency-rising time period in which the frequency linearly increases synchronously with the inputted analog-modulated signal of triangular wave in a sequential manner and a frequency-falling time period in which the frequency linearly decreases immediately following the frequency-rising time period in a sequential manner.

The distributor 14 distributes power of the signal which is outputted from the BA 13 into two directions to generate a local signal and a transmission signal. The transmission signal from the distributor 14 is inputted into the PA 15 and amplified therein, and the local signal is amplified in the LA 17 and then inputted into the plurality of mixers 19a to 19x.

The transmission signal amplified by the PA 15 is inputted into the antenna 16. Accordingly, the antenna 16 transmits a transmission signal of millimeter wave having the frequency-rising time period in which the frequency linearly increases in a sequential manner and the frequency-falling time period in which the frequency linearly decreases immediately following the frequency-rising time period in a sequential manner.

The plurality of receiving antennas 18a to 18x are arranged in the horizontal direction to collectively form an array antenna. The plurality of receiving antennas 18a to 18x each receive a reception signal which is a result of being transmitted from the transmitting antenna 16 and reflected by an object.

The plurality of mixers 19a to 19x each mix the reception signal received from corresponding receiving antennas and the local signal transmitted from the distributor 14 to generate and output a well-known beat signal. This beat signal has a frequency which is called a beat frequency. The beat frequency in the frequency-rising time period in which the frequency of transmission signal increases is called a beat frequency in a rising-modulation period, and the beat frequency in the frequency-falling time period in which the frequency of transmission signal decreases is called a beat frequency in a falling-modulation period, which are used for calculation of a distance to an object and a relative speed of the object by an FMCW method.

The BBAMP 20 amplifies the beat signal which is outputted from each of the plurality of mixers 19a to 19x and inputs it into the ADC 21. The ADC 21 is an AD converter that converts the beat signal inputted into the BBAMP 20 into a digital signal and inputs it into the control unit 22.

The control unit 22 inputs a digital signal of a triangular wave of a predetermined cycle into the DAC 11 as described above at a predetermined sampling timing which comes repeatedly on a periodic basis, and obtains the beat signals inputted from the ADC 21 and performs a processing which is described later. Accordingly, the control unit 22 detects a distance from the apparatus to the target, a direction of the target as seen from the apparatus and a relative speed of the target to the apparatus, and transmits the distance, the direction and the relative speed to an in-vehicle device such as a pre-crash control ECU via the CAN 2.

The bias power supply voltage which is supplied from the power supply bias circuit 10 to the VCO 12, BA 13, PA 15, LA 17 are each applied to the first addition circuit 23. The first addition circuit 23 adds those applied bias power supply voltages and then inputs the addition result voltage into one of input ports of the ADC 21.

Further, power supply bias output points (indicated by the black dots in FIG. 1) of the bias power supply voltage for the VCO 12, BA 13, PA 15, LA 17 and input terminals of the first addition circuit 23 are AC-coupled to each other via a capacitor. Accordingly, only AC components of the bias power supply voltages are applied to the first addition circuit 23. By performing AC-coupling, DC components having different voltages for each of the supplied elements of the bias power supply voltage can be removed.

The bias power supply voltages which are supplied from the power supply bias circuit 10 to the mixers 19a to 19x, BBAMP 20, ADC 21, control unit 22 are each applied to the second addition circuit 24. The second addition circuit 24 adds those applied bias power supply voltages and then inputs the addition result voltage into one of the input ports of the ADC 21 (which is different from the input port for the voltage from the first addition circuit 23).

Further, power supply bias output points (indicated by the black dots) of the bias power supply voltage for the mixers 19a to 19x, BBAMP 20, ADC 21, control unit 22 and input terminals of the second addition circuit 24 are AC-coupled to each other via a capacitor. As a result, only AC components of the bias power supply voltages are applied to the second addition circuit 24. By performing AC-coupling, DC components having different voltages for each of the supplied elements of the bias power supply voltage can be removed.

An operation of the FMCW radar apparatus 1 having the above configuration will be described. The control unit 22 inputs a digital signal of triangular wave of a predetermined cycle into the DAC 11 as described above at a predetermined sampling timing which comes repeatedly on a periodic basis, and performs a process which is shown in FIG. 2.

The processing shown in FIG. 2 starts with step 110 in which a beat signal of each channel which is inputted from the ADC 21 is obtained. The channels correspond to a plurality of receiving antennas which constitute the array antenna, on a one to one basis. For example, a beat signal of the channel of the receiving antenna 18*a* is a beat signal generated from the reception signal received from the receiving antenna 18*a*.

The beat signal to be obtained is a beat signal for one sweep. As shown in FIG. 3, one sweep is a period 43 which includes a pair made up of a frequency-rising time period 41 of the transmission radio wave (modulation signal) TS and a frequency-falling time period 42 which immediately follows the frequency-rising time period 41.

In the subsequent step 120, a digital data of the bias power source voltage added in the first addition circuit 23 and the second addition circuit 24 are obtained from the ADC 21. As shown in FIG. 3, an obtaining period is a voltage obtaining period 44, which is within the one sweep period 43, starting at a point when a first margin period has elapsed from a start of the one sweep period 43 and ending at a point before the end of the period 43 by a second margin period.

When the bias power supply voltages for the VCO 12, BA 13, PA 15, LA 17 are applied to the first addition circuit 23 in the voltage obtaining period 44, AC components of those power supply voltages are added in the first addition circuit 23. Then, the addition result voltage (analog signal) is inputted into one of the input ports of the ADC 21 from the first addition circuit 23. The ADC 21 obtains the voltage inputted into the input port at a predetermined sampling rate, converts it into a digital voltage value in a sequential manner, and inputs it into the control unit 22.

Further, when bias power supply voltages for the mixers 19*a* to 19*x*, BBAMP 20, ADC 21, control unit 22 are applied to the second addition circuit 24 in the voltage obtaining period 44, AC components of those power supply voltages are added in the second addition circuit 24. Then, the addition result voltage (analog signal) is inputted into another input port of the ADC 21 from the second addition circuit 24. The ADC 21 obtains the voltage inputted into the input port at a predetermined sampling rate which is the same as that described above, converts it into a digital voltage value in a sequential manner, and inputs it into the control unit 22.

The control unit 22 thus obtains a first digital voltage value which is outputted from the first addition circuit 23 and digitized in the ADC 21 and also obtains a second digital voltage value which is outputted from the second addition circuit 24 and digitized in the ADC 21. Then, the first digital voltage value is added to the second digital voltage value to generate a synthesized digital voltage value.

This synthesized digital voltage value corresponds to a sum of AC components of the bias power supply voltages from the power supply bias circuit 10 to the VCO 12, BA 13, PA 15, LA 17, mixers 19*a*-19*x*, BBAMP 20, ADC 21, control unit 22. As will be described later, whether there is oscillation in the power supply bias circuit 10 or not can be determined based on changes of the synthesized digital voltage values in the voltage obtaining period 44. Further, obtaining of beat signals which has started in step 110 continues during the voltage obtaining period 44.

When the predetermined voltage obtaining period 44 ends, obtaining of the digital data of the bias power source voltage in step 120 ends. Then, a synthesized digital voltage value processing period 45 starts.

During this period 45, at first in step 130, a time-voltage waveform of the synthesized digital voltage value obtained in step 120 during the voltage obtaining period 44 is converted by fast Fourier transform (which corresponds to an example of discrete Fourier transform). Accordingly, a frequency-intensity property (data that shows signal intensity at each frequency) of the synthesized digital voltage value during the voltage obtaining period 44 can be obtained.

In the subsequent step 140, an oscillation determination is performed. In the oscillation determination, whether a bias power source voltage supplied from the power supply bias circuit 10 is superimposed with an oscillation noise due to oscillation of the power supply bias circuit 10 or not is determined on the basis of the frequency-intensity property of the synthesized digital voltage value which is obtained in the preceding step 130.

Figure 4:
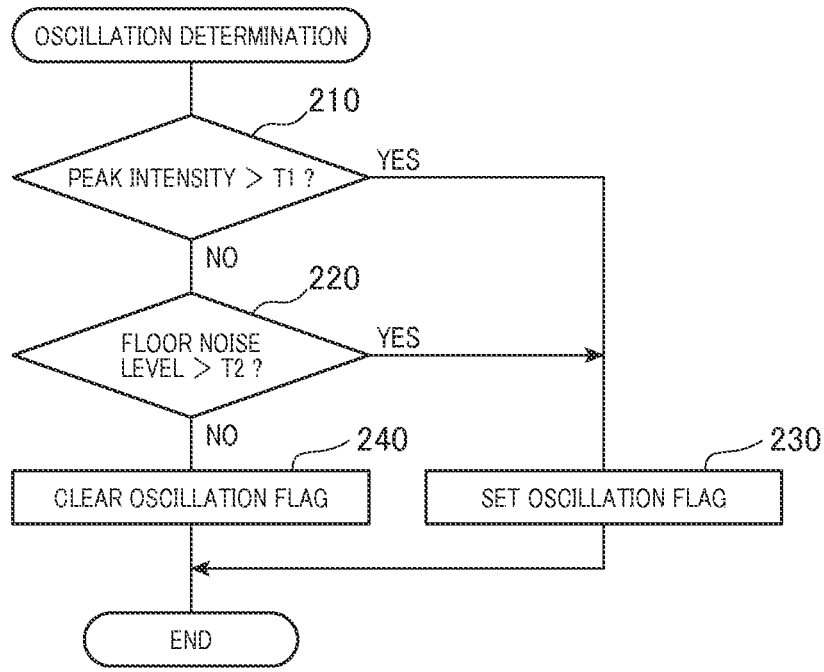
FIG. 4 is a flow chart of an oscillation determination process.

As shown in FIG. 4, the oscillation determination process starts with step 210 in which whether there is a peak value (maximum value) of intensity that exceeds a predetermined intensity threshold T1 or not is determined on the basis of the frequency-intensity property of the synthesized digital voltage value. When there is a value exceeding the intensity threshold T1, the process proceeds to step 230, in which an oscillation flag is set, i.e., turned on, and then the oscillation determination process is completed. When there is no value exceeding the intensity threshold T1, the process proceeds to step 220.

Assuming that the power supply bias circuit 10 oscillates, which causes at least one of the bias power supply voltages supplied to the VCO 12, BA 13, PA 15, LA 17, mixers 19*a* to 19*x*, BBAMP 20, ADC 21, control unit 22 to be superimposed with a stationary oscillation noise. In this case, a high intensity peak is supposed to appear in a portion of the frequency-intensity property of the synthesized digital voltage value which corresponds to the oscillation noise frequency. Therefore, when there is an intensity peak value which exceeds the intensity threshold T1, oscillation of the power supply bias circuit 10 can be detected by turning on the oscillation flag.

In step 220, a floor noise level of the synthesized digital voltage value is calculated. Specifically, frequency integration of intensity is performed on the basis of the frequency-intensity property of the synthesized digital voltage value. Then, the resultant integration value is divided by a frequency range of the frequency-intensity property obtained by FFT. The resultant value of this division is an average value of intensity of the frequency-intensity property, and this average value is defined as a floor noise level. Then, the floor noise is compared with a predetermined floor noise threshold T2 to determine whether the floor noise is larger than the floor noise threshold T2. It should be noted that the floor noise level is not limited to the average value of intensity of the frequency-intensity property, but may be any value which corresponds to the above average value such as the average value multiplied by a coefficient or the square of the average value.

When the floor noise is larger than the floor noise threshold T2, the process proceeds to step 230 in which the oscillation flag is set, and the oscillation determination process is terminated. When the floor noise is equal to or smaller than the floor noise threshold T2, the process proceeds to step 240 in which the oscillation flag is cleared, i.e., turned off, and the oscillation determination process is terminated.

The reason of determining on and off of the oscillation flag on the basis of comparison between the floor noise and the floor noise threshold T2 will be described below.

Figure 5:
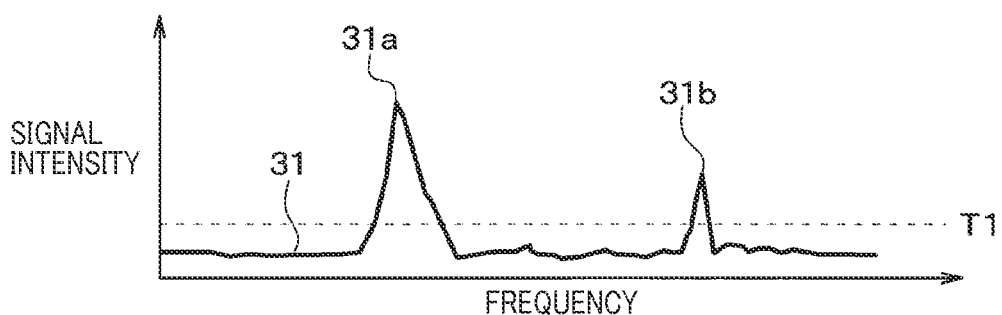
FIG. 5 is a view which shows a frequency-intensity property and a peak threshold.

When the sampling rate of the ADC 21 to the voltage inputted from the first addition circuit 23 and the second addition circuit 24 is sufficiently large compared to the frequency of the oscillation noise (specifically, two times or more of the frequency of the oscillation noise), the oscillation noise appears as peaks 31a, 31b of the oscillation frequency (and an integral multiple of the frequency) in the frequency-intensity property 31 of the synthesized digital voltage value as shown in FIG. 5. For example, when the frequency of the oscillation noise is 50 kHz and the sampling rate is 1 MHz, the oscillation noise appears as a peak in the frequency-intensity property of the synthesized digital voltage value.

Figure 6:
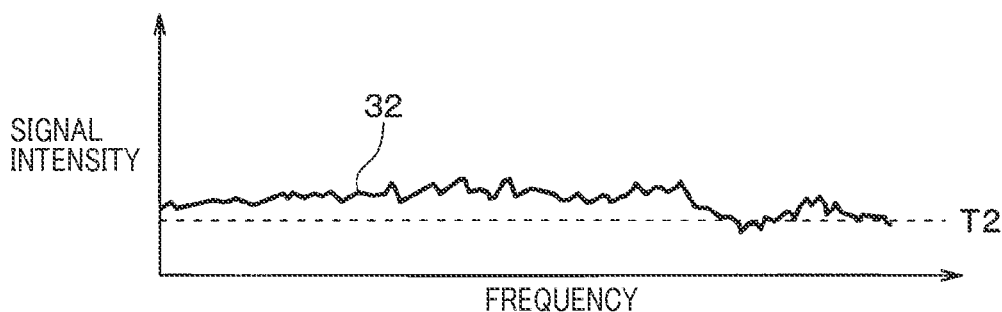
FIG. 6 is a view which shows a frequency-intensity property and a floor noise threshold.

However, when the sampling rate of the ADC 21 to the voltage inputted from the first addition circuit 23 and the second addition circuit 24 is not sufficiently large to the frequency of the oscillation noise, the oscillation noise does not always appear as a peak in the frequency-intensity property of the synthesized digital voltage value. In this case, the oscillation noise is dispersed and sampled across a wide range of frequencies as shown in FIG. 6, and the intensity of the frequency-intensity property 32 increases across a wide range of frequencies. For example, when the frequency of oscillation noise is in the order of tens of MHz and the sampling rate is 1 MHz, the oscillation noise does not appear as a peak in the frequency-intensity property of the synthesized digital voltage value.

Accordingly, when the floor noise is larger than the floor noise threshold T2, the process proceeds to step 230 in which the oscillation flag is set, thereby allowing for detection of the oscillation noise of the frequency which cannot be detected as a peak in the sampling cycle of the ADC 21.

The oscillation determination process of step 140 is followed by step 150 to determine whether the power supply bias circuit 10 has oscillation or not on the basis of the result of oscillation determination process. Specifically, when the oscillation flag is off, the power supply bias circuit 10 is determined not to have oscillation, and the process proceeds to step 160. When the oscillation flag is on, the power supply bias circuit 10 is determined to have oscillation, and the process proceeds to step 170.

In step 160, a known distance measuring process of radar is performed. That is, a distance from the FMCW radar apparatus 1 to the target (object such as another vehicle) and a relative speed of the target to the FMCW radar apparatus 1 are detected by performing a process such as a known FFT process, a receiving direction estimation process, a pair match process and a targeting process on the basis of beat signals of the respective channels obtained in the period 43. A technique of detecting a distance and a relative speed of the target on the basis of beat signals of the respective channels are known, and the description thereof will be omitted herein.

Further, in step 160, information of the distance and the relative speed of the detected target, that is, a target data is transmitted to the pre-crash control ECU via the CAN 2. On receiving the target data, the pre-crash control ECU performs pre-crash control, which is a known technique. For example, whether there is an approaching target or not within a predetermined distance from the FMCW radar apparatus 1 at a predetermined relative speed or more is determined. In the case where there is an approaching target, collision with the target is avoided by operating an automatic brake, operating a pretensioner, and outputting an alarm sound. After step 160, the process returns to step 110 when the next sampling timing comes.

In step 170, a signal indicating that there is oscillation in the power supply bias circuit 10 is outputted to the pre-crash control ECU and the like via the CAN 2. On receiving the signal, the pre-crash control ECU can notify an abnormality to a passenger in the vehicle. After step 170, the distance measuring process is terminated since there is a risk of performing an erroneous detection due to abnormality in the power supply bias circuit 10. That is, the process of step 160 is not further repeated.

As described above, the control unit 22 obtains the frequency-intensity property of the voltage value which corresponds to the bias power supply voltage for each of the elements during the voltage obtaining period 44 which is within the period 43 in which the transmitting section transmits a transmission signal and the receiving section outputs a beat signal. Then, whether there is oscillation in the power supply bias circuit 10 or not is determined on the basis of whether the frequency-intensity property satisfies a predetermined oscillation condition or not (a condition that at least one of determination results of steps 210 and 220 is affirmative). Further, the bias power supply voltage for each of the elements in a period other than the period 43 is not used for determination of whether there is oscillation or not in the power supply bias circuit 10.

With the above configuration, oscillation noise caused by oscillation of the power supply bias circuit can be detected in a non-conventional way. Further, oscillation of the power supply bias circuit 10 during actual distance measuring operation of the FMCW radar apparatus 1 (that is, during the period 43) can be directly detected since the frequency-intensity property which is used for determining whether there is oscillation or not is that of the voltage obtaining period in which the transmitting section transmits a transmission signal and a receiving section outputs a beat signal.

Further, a voltage value for obtaining the frequency-intensity property is a sum of voltage values of the bias power supply voltages for a plurality of bias power supply voltage supplied elements. By using such a value, whether an oscillation noise is applied to one or more of circuits of the plurality of bias power supply voltage supplied elements or not can be determined by calculating a single frequency-intensity property.

Further, a voltage with a bias power supply voltage for the plurality of bias power supply voltage supplied elements being added thereto is applied from the first addition circuit 23, the second addition circuit 24 to the ADC 21. Accordingly, the number of necessary input ports can be decreased since the ADC 21 does not need to receive a voltage input from all of the plurality of bias power supply voltage supplied elements.

In the present embodiment, a function of sampling the voltage inputted from the first addition circuit 23 and the second addition circuit 24, among the first addition circuit 23, the second addition circuit 24 and the ADC 21, and outputting it as a digital voltage value corresponds to an example of circuit which receives the bias power supply voltage supplied from the power supply bias circuit to one or more of the circuits of the transmitting section, the receiving section and the control unit and outputs a signal depending on the inputted bias power supply voltage. Further, the control unit 22 functionally serves as an example of a frequency-intensity property obtaining unit (or frequency-intensity property obtaining means) by performing step 130 of FIG. 2, and functionally serves as an example of a determination unit (or determination means) by performing steps 140, 150.

Second Embodiment

Next, the second embodiment of the present invention will be described. In the first embodiment, whether there is oscillation in the power supply bias circuit 10 or not is determined on the basis of a sum of AC components of the bias power supply voltages from the power supply bias circuit 10 to the VCO 12, BA 13, PA 15, LA 17, mixers 19a to 19x, BBAMP 20, ADC 21, control unit 22. According to the present embodiment, however, whether there is oscillation in the power supply bias circuit 10 or not is determined by individually obtaining the frequency-intensity properties of the bias power supply voltages supplied to each of the elements 12, 13, 15, 17, 19a to 19x, 20, 21, 22.

Figure 7:
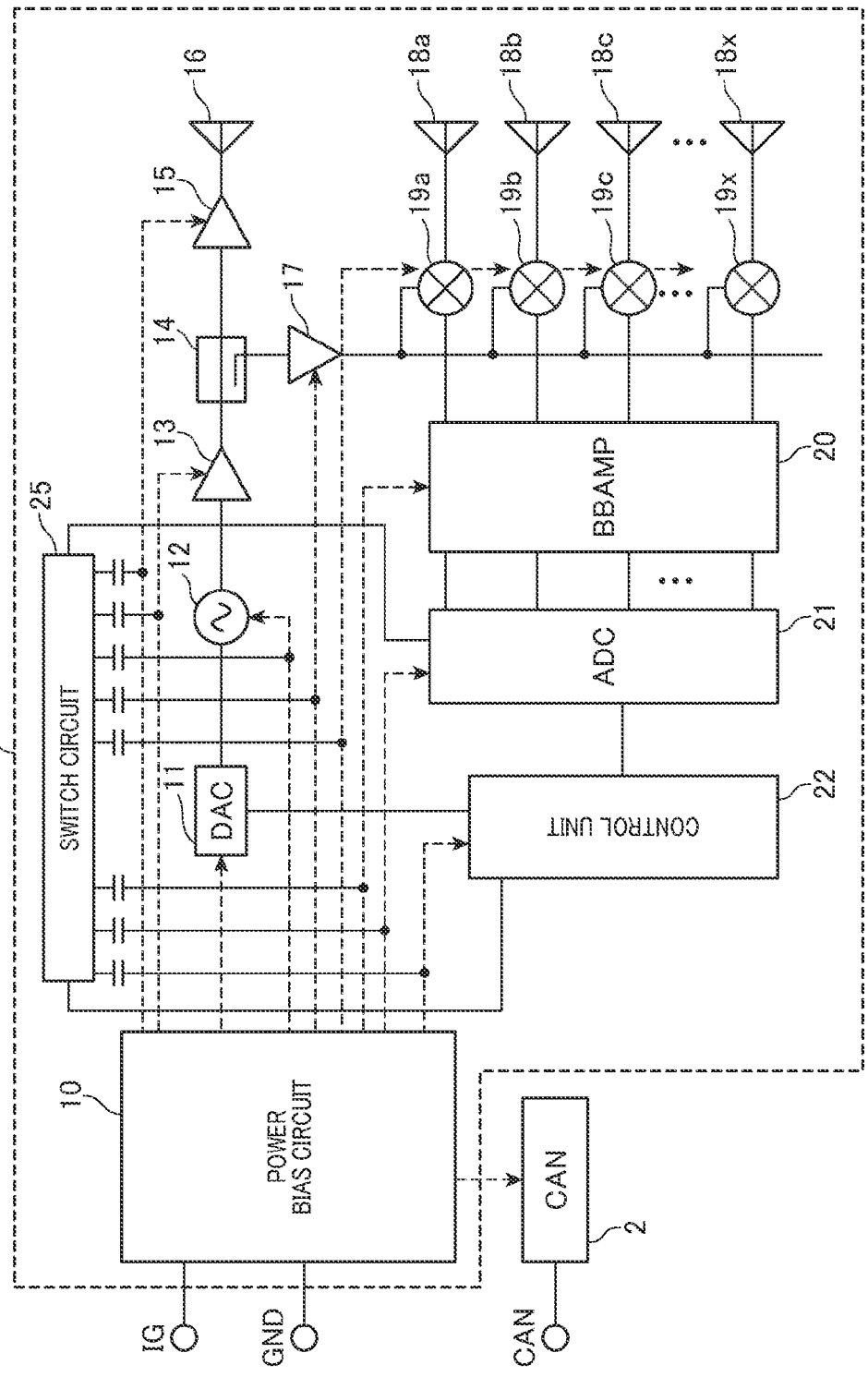
FIG. 7 is a block diagram of the FMCW radar apparatus according to a second embodiment of the present invention.

FIG. 7 shows a configuration of the FMCW radar apparatus 1 according to the present embodiment. The elements denoted by the same reference numbers in FIGS. 1 and 7 have the same functions, and the detailed description thereof will be omitted herein.

The FMCW radar apparatus 1 of the present embodiment differs from that of the first embodiment in that the first addition circuit 23 and the second addition circuit 24 are eliminated and a switch circuit 25 is newly provided in the present embodiment.

The bias power source voltages which are supplied from the power supply bias circuit 10 to the VCO 12, BA 13, PA 15, LA 17, mixers 19a to 19x, BBAMP 20, ADC 21, control unit 22 are each applied to the switch circuit 25. The switch circuit 25 selects one of those bias power source voltages in response to control of the control unit 22 and inputs it into one of the input ports of the ADC 21.

Further, the power supply bias output points (indicated by the black dots) of the bias power supply voltage for the VCO 12, BA 13, PA 15, LA 17, mixers 19a to 19x, BBAMP 20, ADC 21, control unit 22 and the input terminals of the switch circuit 25 are AC-coupled to each other via a capacitor. As a result, only AC components of the bias power supply voltages are applied to the switch circuit 25. By performing AC-coupling, DC components having different voltages for each of the bias power supply voltage supplied elements can be removed.

An operation of the FMCW radar apparatus 1 of the present embodiment will be described below, focusing on the difference from the first embodiment. The control unit 22 inputs a digital signal of triangular wave of a predetermined cycle into the DAC 11 at a predetermined sampling timing, and performs a processing shown in FIG. 8 instead of the processing shown in FIG. 2.

Figure 8:
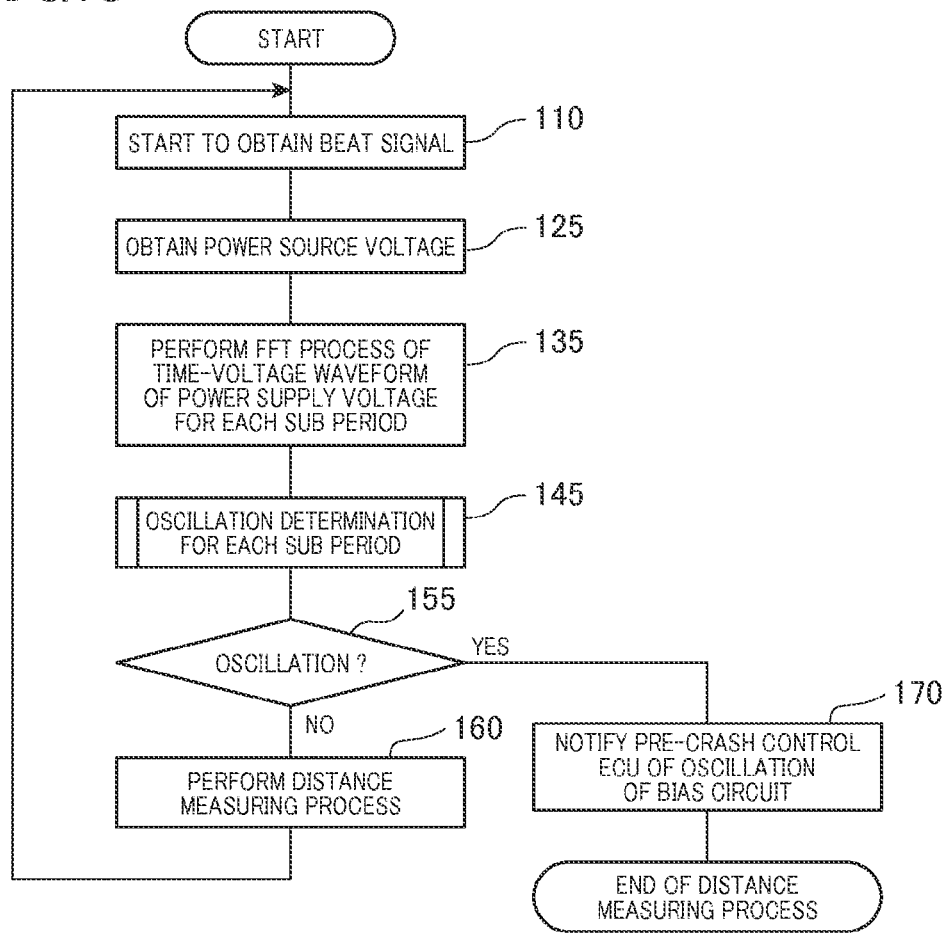
FIG. 8 is a flow chart of a processing performed by the control unit.

The processing shown in FIG. 8 starts with step 110 in which a beat signal of each channel which is inputted from the ADC 21 is obtained in the same manner as that of step 110 of FIG. 2.

Figure 9:
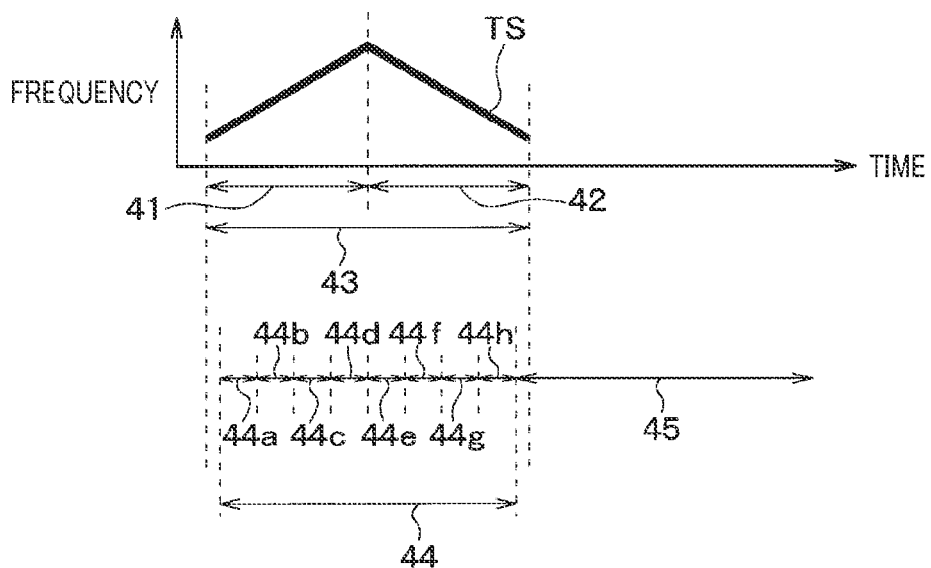

The beat signal to be obtained is a beat signal for one sweep. As shown in FIG. 9, one sweep is the period 43 which includes a pair made up of the frequency-rising time period 41 of the transmission radio wave (modulation signal) TS and the frequency-falling time period 42 which immediately follows the frequency-rising time period 41.

In the subsequent step 125, a digital data of the bias power source voltage inputted from the switch circuit 25 to the ADC 21 as described above is obtained from the ADC 21. As shown in FIG. 9, an obtaining period is the voltage obtaining period 44, which is within the one sweep period 43, starting at a point when a first margin period has elapsed from a start of the one sweep period 43 and ending at a point before the end of the period 43 by a second margin period.

In the voltage obtaining period 44, the bias power source voltage selected by the switch circuit 25 to be inputted into the ADC 21 is switched to be the voltage supplied to the VCO 12, the voltage supplied to the BA 13, the voltage supplied to the PA 15, the voltage supplied to the LA 17, the voltage supplied to the mixers 19a to 19x, the voltage supplied to the BBAMP 20, the voltage supplied to the ADC 21, and the voltage supplied to the control unit 22, in sequence.

Specifically, the switch circuit 25 is controlled to switch the bias power source voltages so that the bias power source voltage supplied to the VCO 12 is inputted into the ADC 21 in a first sub-period 44a in the voltage obtaining period 44, the bias power source voltage supplied to the BA 13 is inputted into the ADC 21 in a second sub-period 44b, the bias power source voltage supplied to the PA 15 is inputted into the ADC 21 in a third sub-period 44c, the bias power source voltage supplied to the LA 17 is inputted into the ADC 21 in a fourth sub-period 44d, the bias power source voltage supplied to the mixers 19a to 19x is inputted into the ADC 21 in a fifth sub-period 44e, the bias power source voltage supplied to the BBAMP 20 is inputted into the ADC 21 in a sixth sub-period 44f, the bias power source voltage supplied to the ADC 21 is inputted into the ADC 21 in a seventh sub-period 44g, and the bias power source voltage supplied to the control unit 22 is inputted into an eighth sub-period 44h.

As a result, the ADC 21 obtains the bias power source voltage supplied to each of the elements 12, 13, 15, 17, 19a to 19x, 20, 21, 22 in the first sub-period 44a to the eighth sub-period 44h, respectively, at a predetermined sampling rate, converts it into a digital voltage value in a sequential manner, and inputs it into the control unit 22.

Accordingly, the control unit 22 obtains the digital voltage values of the bias power source voltages supplied to each of the elements 12, 13, 15, 17, 19a to 19x, 20, 21, 22 in the first sub-period 44a to the eighth sub-period 44h, respectively. Further, lengths of the first sub-period 44a to the eighth sub-period 44h are each predetermined.

When a predetermined voltage obtaining period 44 ends, obtaining of the digital data of the bias power source voltage in step 125 ends, and then, the digital voltage value processing period 45 starts.

During this period 45, at first in step 135, a time-voltage waveform of each digital voltage value obtained in the sub-periods 44a to 44h by using the digital voltage value obtained in step 125 is converted by fast Fourier transform. Accordingly, the frequency-intensity property of the digital voltage value in the sub-periods 44a to 44h can be obtained.

In the subsequent step 145, an oscillation determination process is performed. The oscillation determination process determines whether a bias power source voltage supplied from the power supply bias circuit 10 is superimposed with an oscillation noise due to oscillation of the power supply bias circuit 10 or not on the basis of the frequency-intensity property of the synthesized digital voltage value which is obtained in the preceding step 135.

Specifically, the processing shown in FIG. 4 in the first embodiment is performed for each of the first sub-period 44a to the eighth sub-period 44h by using the frequency-intensity property based on the digital voltage signal obtained in the respective sub-periods. However, the oscillation flags are separately provided for each of the first sub-period 44a to the eighth sub-period 44h. Specifically, the first to eighth sub oscillation flags are used as oscillation flags for the first sub-period 44a to the eighth sub-period 44h, respectively. Accordingly, the sub oscillation flags corresponding to the first sub-period 44a to the eighth sub-period 44h are determined to be on or off on the basis of the frequency-intensity property of the respective sub-periods.

The oscillation determination of step 145 is followed by step 155 to determine whether the power supply bias circuit 10 has oscillation or not on the basis of the result of oscillation determination. Specifically, when all the first to eighth sub oscillation flags are off, the power supply bias circuit 10 is determined not to have oscillation, and the process proceeds to step 160. On the other hand, when one or more of the first to eighth sub oscillation flags are on, the power supply bias circuit 10 is determined to have oscillation, and the process proceeds to step 170.

The process performed in step 160 and the corresponding operation of the pre-crash control ECU are the same as those of the first embodiment.

In step 170, a signal indicating that there is oscillation in the power supply bias circuit 10 is outputted to the pre-crash control ECU and the like via the CAN 2. Here, information of the bias power supply voltage supplied element which corresponds to the sub oscillation flag which is on (for example, the VCO 12 when the first oscillation flag is on) may be outputted into the pre-crash control ECU or the like.

On receiving the signal, the pre-crash control ECU can notify an abnormality to a passenger in the vehicle. In the case where the pre-crash control ECU receives information of the bias power supply voltage supplied elements which corresponds to the sub oscillation flag which is on, it can notify that information to the passenger in the vehicle. After step 170, the distance measuring process is terminated since there is a risk of performing an erroneous detection due to abnormality in the power supply bias circuit 10. That is, the process of step 160 is not further repeated.

With the above configuration, the same effect as that of the first embodiment can be achieved. Further, the switch circuit 25 and the ADC 21 output the bias power supply voltage which is supplied to each of the plurality of bias power supply voltage supplied elements 12, 13, 15, 17, 19a to 19x, 20, 21, 22 by switching the supplied elements one by one. Then, the control unit 22 obtains one of different frequency-intensity properties of the bias power supply voltages supplied to each of the plurality of bias power supply voltage supplied elements 12, 13, 15, 17, 19a to 19x, 20, 21, 22 in a plurality of sub-periods 44a to 44h in the voltage obtaining period 44. Further, the control unit 22 determines that there is oscillation in the power supply bias circuit 10 on the basis that at least one of the frequency-intensity properties of the bias power supply voltages supplied to the plurality of bias power supply voltage supplied elements satisfies a predetermined oscillation condition (a condition that at least one of determination results of steps 210 and 220 is affirmative).

With the above configuration, the supplied element in which the bias power supply voltage is superimposed with noise can be detected among the plurality of supplied elements of the bias power supply voltage from the power supply bias circuit 10.

In the present embodiment, a function of sampling the voltage inputted from the first addition circuit 23 and the second addition circuit 25, among the switch circuit 25 and the ADC 21, and outputting it as a digital voltage value corresponds to an example of circuit which receives the bias power supply voltage supplied from the power supply bias circuit to one or more of the circuits of the transmitting section, the receiving section and the control unit and outputs a signal depending on the inputted bias power supply voltage.

Further, the control unit 22 functionally serves as an example of a frequency-intensity property obtaining unit (or frequency-intensity property obtaining means) by performing step 135 of FIG. 8, and functionally serves as an example of a determination unit (or determination means) by performing steps 145, 155.

Other Embodiments

The present invention is not limited to the above embodiments, and alterations may be made as appropriate within the scope of the appended claims. Further, the above embodiments are not independent from each other and may be combined as appropriate except for the cases where a combination is obviously impossible. Further, needless to say, elements in the embodiments are not necessarily required except for the cases where they are explicitly described to be necessary or regarded as obviously necessary in principle in the above embodiments. In the above embodiments, when reference is made to the number of elements or the like, such as the number of pieces, value, amount and range of elements, the number of elements is not limited thereto except for the cases where it is explicitly described to be necessary or obviously regarded as a specific number in principle. In addition, in the above embodiments, when reference is made to a shape, positional relationship of elements or the like, the shape, positional relationship or the like of elements is not limited thereto except for the cases where it is explicitly described or limited to a specific shape, positional relationship or the like in principle.

Modification 1

In the first, second embodiments, for example, oscillation is determined to be present in the power supply bias circuit 10 in steps 150, 155 of FIG. 2 when the oscillation flag at a certain sampling timing (in the first embodiment, one or more sub-oscillation flags; the same applies hereinafter) is on, even if the oscillation flag is not on at a preceding sampling timing. Then, a signal indicating that there is oscillation is transmitted to the pre-crash control ECU.

However, the invention is not necessarily limited thereto. For example, oscillation may not be determined to be present in the power supply bias circuit 10 in step 155 of FIG. 2 until the number of times of the sampling timing at which the oscillation flag is on reaches a predetermined plurality of number or more. When the number of times of the sampling timing at which the oscillation flag is on reaches a predetermined plurality of number or more, oscillation may be determined to be present in the power supply bias circuit 10, and a signal indicating that there is oscillation may be transmitted to the pre-crash control ECU. With this configuration, more accurate oscillation determination can be performed.

Modification 2

Further, in the first, second embodiments, the voltage obtaining period 44 is within the one sweep period 43 and is shorter than the one sweep period 43. However, the voltage obtaining period 44 may be consistent with the one sweep period 43.

Modification 3

Further, in the above first, second embodiments, the power supply bias output points of the bias power supply voltage (the black dots in FIG. 1, FIG. 7) and the input terminals of the first addition circuit 23, the second addition circuit 24, the switch circuit 25 are AC-coupled to each other via a capacitor. However, they may be directly connected without using a capacitor instead of being AC-coupled if it is not necessary to remove DC components having different voltages for each of the bias power supply voltage supplied elements.

Modification 4

Further, in the above first, second embodiments, oscillation in the bias circuit 10 is determined on the basis of the bias power supply voltage for part of the members which receives the bias power supply voltage supplied from the power supply bias circuit 10 in the FMCW radar apparatus 1, that is, 12, 13, 15, 17, 19a to 19x, 20, 21, 22. However, oscillation in the bias circuit 10 may be determined on the basis of the bias power supply voltage for all of the members (including the DAC, the first addition circuit 23, the second addition circuit 24) instead of part of the members.

Modification 5

Further, in the above first, second embodiments, the determination process in step 210 may be omitted, or the determination process in step 220 may be omitted. In the former case, the oscillation determination process may be performed in step 220. In the latter case, when the peak intensity does not exceed the intensity threshold T1 in step 210, step 240 may follow.

Modification 6

In the first, second embodiments, the transmitting section may include, in addition to the frequency-rising time period in which a frequency sequentially increases and the frequency-falling time period in which a frequency sequentially decreases, a frequency-constant time period in which a frequency remains at a constant value which is provided before the frequency-rising time period, between the frequency-rising time period and the frequency-falling time period or after the frequency-falling time period, and a period of the frequency-constant time period may include part or all of the voltage obtaining period 44.

Providing the frequency-constant time period which is not used for distance measuring operation allows determination of oscillation in the bias circuit 10 to be performed without effecting on the distance measuring operation.

Modification 7

In the first, second embodiments, when it is known that oscillation due to malfunction of the power supply bias circuit 10 occurs not only in the one sweep period 43 but occurs on a constant basis, part or all of the voltage obtaining period 44 may be a period other than the one sweep period 43.

Providing the voltage obtaining period 44 as a period which is not used for a distance measuring operation allows determination of oscillation in the bias circuit 10 to be performed without effecting on the distance measuring operation.

Further, the FMCW radar apparatus may be provided, for example, as a millimeter wave radar for collision prevention or a millimeter wave radar for following and controlling the preceding vehicle.

REFERENCE SIGNS LIST

1 FMCW radar apparatus
10 power supply bias circuit
11 DAC
12 VCO
13 BA
14 distributor
15 PA
16 transmitting antenna
17 LA
18a to 18x receiving antenna
19a to 19x mixer
22 control unit
23 first addition circuit
24 second addition circuit
25 switch circuit

The invention claimed is:

1. A frequency modulated continuous wave (FMCW) radar apparatus, comprising:
   a transmitting section that transmits a transmission signal having a frequency-rising time period in which frequency sequentially increases and a frequency-falling time period in which the frequency sequentially decreases;
   a receiving section that receives a reception signal which is a result of the transmission signal being reflected by an object and outputs a beat signal on the basis of the transmission signal and the reception signal;
   a control unit that detects a target on the basis of the beat signal;
   a power supply bias circuit that generates a bias power supply voltage; and
   a circuit that outputs a voltage value which corresponds to the inputted bias power supply voltage which is inputted from the power supply bias circuit to at least the transmitting section and the control unit among the transmitting section, the receiving section and the control unit, wherein
   the control unit includes a frequency-intensity property obtaining unit that obtains a frequency-intensity property of the voltage value outputted from the circuit during a voltage obtaining period which is within a period in which the transmitting section transmits the transmission signal and the receiving section outputs the beat signal, and
   a determination unit that determines whether there is oscillation in the power supply bias circuit or not on the basis of whether the frequency-intensity property obtained by the frequency-intensity property obtaining unit satisfies a predetermined oscillation condition or not.

2. The FMCW radar apparatus according to claim 1, characterized in that the determination unit determines that there is oscillation in the power supply bias circuit when there is an intensity peak value that exceeds a predetermined intensity threshold in the frequency-intensity property, and determines that there is no oscillation in the power supply bias circuit when there is no intensity peak value that exceeds the intensity threshold.

3. The FMCW radar apparatus according to claim 1, wherein the determination unit determines that there is oscillation in the power supply bias circuit when an amount which corresponds to an intensity average in the frequency-intensity property exceeds a predetermined floor noise threshold, and determines that there is no oscillation in the power supply bias circuit when the amount does not exceed the floor noise threshold.

4. The FMCW radar apparatus according to claim 1, wherein the circuit outputs a voltage value which corresponds to a voltage with a bias power supply voltage to be supplied to a plurality of bias power supply voltage supplied elements of the FMCW radar apparatus is added thereto, the frequency-intensity property obtaining unit obtains the frequency-intensity property of the voltage value outputted from the circuit in the voltage obtaining period, and the determination unit determines whether there is oscillation in the power supply bias circuit or not on the basis of whether the frequency-intensity property obtained by the frequency-intensity property obtaining unit satisfies a predetermined oscillation condition or not.

5. The FMCW radar apparatus according to claim 1, wherein the circuit outputs the bias power supply voltages to be supplied to the plurality of bias power supply voltage supplied elements of the FMCW radar apparatus while switching the bias power supply voltages one by one for each of the supplied elements, the frequency-intensity property obtaining unit obtains one frequency-intensity property, among the bias power supply voltages to be supplied to the plurality of bias power supply voltage supplied elements, which is different for each of a plurality of sub periods in the voltage obtaining period, and the determination unit determines that there is oscillation in the power supply bias circuit when one or more of the frequency-intensity properties of the bias power supply voltages to be supplied to the plurality of bias power supply voltage supplied elements satisfy the predetermined oscillation condition.

6. The FMCW radar apparatus according to claim 1, wherein a power supply bias output point of the bias power supply voltage for each of the plurality of bias power supply voltage supplied elements of the FMCW radar apparatus and an input terminal of the circuit are AC-coupled to each other.

7. A frequency modulated continuous wave (FMCW) radar apparatus, comprising:

a transmitting section that transmits a transmission signal having a frequency-rising time period in which frequency sequentially increases, a frequency-falling time period in which the frequency sequentially decreases and a frequency-constant time period in which the frequency remains at a constant value in a specific period;

a receiving section that receives a reception signal which is a result of the transmission signal being reflected by an object and outputs a beat signal on the basis of the transmission signal and the reception signal;

a control unit that detects a target on the basis of the beat signal;

a power supply bias circuit that generates a bias power supply voltage; and a circuit that outputs a voltage value which corresponds to the inputted bias power supply voltage which is inputted from the power supply bias circuit to at least the transmitting section and the control unit among the transmitting section, the receiving section and the control unit, wherein the control unit includes a frequency-intensity property obtaining unit that obtains a frequency-intensity property of the voltage value outputted from the circuit during a voltage obtaining period which is within a period in which the transmitting section transmits the transmission signal and the receiving section outputs the beat signal, and a determination unit that determines whether there is oscillation in the power supply bias circuit or not on the basis of whether the frequency-intensity property obtained by the frequency-intensity property obtaining unit satisfies a predetermined oscillation condition or not.

8. The FMCW radar apparatus according to claim 7, wherein part or all of the voltage obtaining period is included in a transmission time of the frequency-constant time period.

9. The FMCW radar apparatus according to claim 7, characterized in that the determination unit determines that there is oscillation in the power supply bias circuit when there is an intensity peak value that exceeds a predetermined intensity threshold in the frequency-intensity property, and determines that there is no oscillation in the power supply bias circuit when there is no intensity peak value that exceeds the intensity threshold.

10. The FMCW radar apparatus according to claim 7, wherein the determination unit determines that there is oscillation in the power supply bias circuit when an amount which corresponds to an intensity average in the frequency-intensity property exceeds a predetermined floor noise threshold, and determines that there is no oscillation in the power supply bias circuit when the amount does not exceed the floor noise threshold.

11. The FMCW radar apparatus according to claim 7, wherein the circuit outputs a voltage value which corresponds to a voltage with a bias power supply voltage to be supplied to a plurality of bias power supply voltage supplied elements of the FMCW radar apparatus is added thereto, the frequency-intensity property obtaining unit obtains the frequency-intensity property of the voltage value outputted from the circuit in the voltage obtaining period, and the determination unit determines whether there is oscillation in the power supply bias circuit or not on the basis of whether the frequency-intensity property obtained by the frequency-intensity property obtaining unit satisfies a predetermined oscillation condition or not.

12. The FMCW radar apparatus according to claim 7, wherein the circuit outputs the bias power supply voltages to be supplied to the plurality of bias power supply voltage supplied elements of the FMCW radar apparatus while switching the bias power supply voltages one by one for each of the supplied elements, the frequency-intensity property obtaining unit obtains one frequency-intensity property, among the bias power supply voltages to be supplied to the plurality of bias power supply voltage supplied elements, which is different for each of a plurality of sub periods in the voltage obtaining period, and the determination unit determines that there is oscillation in the power supply bias circuit when one or more of the frequency-intensity properties of the bias power supply voltages to be supplied to the plurality of bias power supply voltage supplied elements satisfy the predetermined oscillation condition.

13. The FMCW radar apparatus according to claim 7, wherein a power supply bias output point of the bias power supply voltage for each of the plurality of bias power supply voltage supplied elements of the FMCW radar apparatus and an input terminal of the circuit are AC-coupled to each other.

14. A frequency modulated continuous wave (FMCW) radar apparatus, comprising:
- a transmitting section that transmits a transmission signal having a frequency-rising time period in which frequency sequentially increases, a frequency-falling time period in which the frequency sequentially decreases and a frequency-constant time period in which the frequency remains at a constant value in a specific period;
- a receiving section that receives a reception signal which is a result of the transmission signal being reflected by an object and outputs a beat signal on the basis of the transmission signal and the reception signal;
- a control unit that detects a target on the basis of the beat signal;
- a power supply bias circuit that generates a bias power supply voltage having at least one malfunction mode in which oscillation in the bias circuit due to malfunction continues regardless of a state of the transmitting section or the receiving section; and
- a circuit that outputs a voltage value which corresponds to the inputted bias power supply voltage which is inputted from the power supply bias circuit to at least the transmitting section and the control unit among the transmitting section, the receiving section and the control unit, wherein
- the control unit includes a frequency-intensity property obtaining unit that obtains a frequency-intensity property of the voltage value outputted from the circuit during a voltage obtaining period part or all of which includes a period other than a period in which the transmitting section transmits the transmission signal and the receiving section outputs the beat signal, and
- a determination unit that determines whether there is oscillation in the power supply bias circuit or not on the basis of whether the frequency-intensity property obtained by the frequency-intensity property obtaining unit satisfies a predetermined oscillation condition or not.

15. The FMCW radar apparatus according to claim 14, wherein part or all of the voltage obtaining period is included in the frequency-constant time period.

16. The FMCW radar apparatus according to claim 14, wherein the determination unit determines that there is oscillation in the power supply bias circuit when there is an intensity peak value that exceeds a predetermined intensity threshold in the frequency-intensity property, and determines that there is no oscillation in the power supply bias circuit when there is no intensity peak value that exceeds the intensity threshold.

17. The FMCW radar apparatus according to claim 14, wherein the determination unit determines that there is oscillation in the power supply bias circuit when an amount which corresponds to an intensity average in the frequency-intensity property exceeds a predetermined floor noise threshold, and determines that there is no oscillation in the power supply bias circuit when the amount does not exceed the floor noise threshold.

18. The FMCW radar apparatus according to claim 14, wherein
- the circuit outputs a voltage value which corresponds to a voltage with a bias power supply voltage to be supplied to a plurality of bias power supply voltage supplied elements of the FMCW radar apparatus is added thereto,
- the frequency-intensity property obtaining unit obtains the frequency-intensity property of the voltage value outputted from the circuit in the voltage obtaining period, and
- the determination unit determines whether there is oscillation in the power supply bias circuit or not on the basis of whether the frequency-intensity property obtained by the frequency-intensity property obtaining unit satisfies a predetermined oscillation condition or not.

19. The FMCW radar apparatus according to claim 14, wherein
- the circuit outputs the bias power supply voltages to be supplied to the plurality of bias power supply voltage supplied elements of the FMCW radar apparatus while switching the bias power supply voltages one by one for each of the supplied elements,
- the frequency-intensity property obtaining unit obtains one frequency-intensity property, among the bias power supply voltages to be supplied to the plurality of bias power supply voltage supplied elements, which is different for each of a plurality of sub periods in the voltage obtaining period, and
- the determination unit determines that there is oscillation in the power supply bias circuit when one or more of the frequency-intensity properties of the bias power supply voltages to be supplied to the plurality of bias power supply voltage supplied elements satisfy the predetermined oscillation condition.

20. The FMCW radar apparatus according to claim 14, wherein a power supply bias output point of the bias power supply voltage for each of the plurality of bias power supply voltage supplied elements of the FMCW radar apparatus and an input terminal of the circuit are AC-coupled to each other.

* * * * *